Patented Nov. 8, 1932

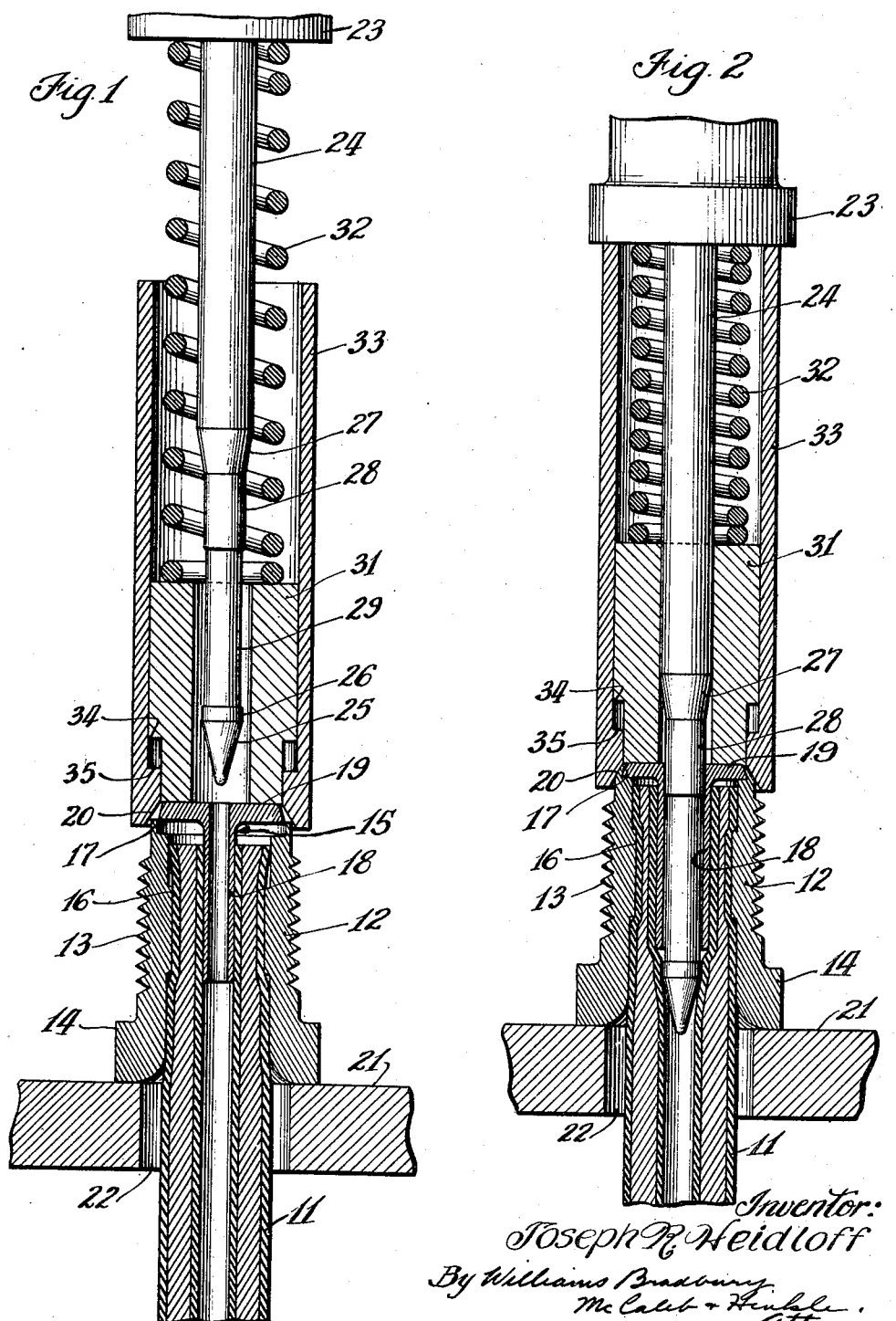

1,886,807

UNITED STATES PATENT OFFICE

JOSEPH R. HEIDLOFF, OF DETROIT, MICHIGAN, ASSIGNOR TO HYDRAULIC BRAKE COMPANY OF LOS ANGELES, CALIFORNIA, A CORPORATION OF CALIFORNIA

HOSE COUPLING ASSEMBLING MACHINE

Application filed May 4, 1929. Serial No. 360,360.

This invention relates to hose coupling assembling apparatus and will be described with particular reference to an apparatus for assembling end connectors or couplings for high pressure hose.

The couplings used in high pressure hose such as used in hydraulic brake systems must be firmly and securely attached to the hose in order to prevent the high pressures in the hose from separating the coupling from the hose. These couplings usually consist of a threaded sleeve surrounding the hose having a somewhat smaller bore than the outer diameter of the hose and a thimble within the end of the bore of the hose for compressing the hose against the outer sleeve. In order to obtain the best results the sleeve and thimble are preferably interlocked to prevent relative movement of these parts.

An object of the invention is to provide an apparatus for assembling a coupling on the end of a hose.

A further object is to provide an apparatus for securely attaching a coupling to a substantially non-expansible hose.

A further object is to provide an apparatus for forming an interlocking connection between a hose and a coupling member.

A further object is to provide an apparatus for assembling a sleeve and thimble on a hose and interlocking the thimble and sleeve.

A further object is to provide an apparatus for sequentially inserting a thimble in a hose, expanding the thimble and interlocking the thimble and sleeve.

Referring to the drawing:

Fig. 1 is a side elevation, partly in section, of an apparatus embodying the invention showing the apparatus at the beginning of the assembling operation; and Fig. 2 is a similar view showing the apparatus at the completion of the assembling operation.

The apparatus is illustrated in connection with the assembling of a particular type of coupling or end connection for a hose although it will be apparent that the apparatus may be readily adapted to assemble other types of hose connections. A hose 11 is shown of the high pressure type such as used in hydraulic brake systems and has a sleeve 12 placed over the end thereof. The sleeve comprises a cylindrical portion provided with threads 13 for connecting the sleeve to a companion member of a motor vehicle or the like. The lower end 14 of the sleeve 12 is flared radially outwardly and is preferably provided with a hexagonal periphery to facilitate threading the sleeve into another member.

The sleeve is provided with an internal bore of a slightly smaller diameter than the hose to cause a slight compression of the hose when the hose is inserted in the sleeve so that upon the subsequent expansion of the hose by a thimble 15 which is inserted therein the hose will not be expanded beyond the mean diameter of the hose.

The interior of the sleeve is provided with a portion 16 of a smaller diameter than the remaining portion of the sleeve, thereby providing an enlarged portion adjacent the end of the hose which is compressed to a lesser degree than the intermediate portion, resulting in a strong interlocking connection between the hose and the sleeve. The end of the sleeve is provided with an axially extending flange 17 formed by enlarging the bore of the sleeve adjacent the end.

The thimble 15 which is adapted to be inserted in the hose and expanded therein and interlocked with the sleeve comprises a cylindrical portion 18 having a disc 19 integral with the end thereof. The periphery of the disc-shaped portion 19 is slightly bevelled so that when seated upon the shoulder within the sleeve, flange 17 of the sleeve may be crimped inwardly to form an interlock between the sleeve and the thimble.

In assembling the coupling upon the end of a hose, the hose is first manually inserted within the sleeve and the end of the thimble is placed within the bore of the hose. The sleeve and hose are then placed upon an anvil 21 having a slot 22 therein permitting the hose to be laterally inserted within the slot in such a position that the head of the sleeve will rest upon the anvil.

The apparatus for assembling the coupling comprises a press head 23 carrying a plunger 24. The lower end of the plunger 25 is cone-shaped and serves to expand the cylindrical portion 18 of the thimble to compress the hose against the inner wall of the sleeve.

Rearwardly of the cone-shaped portion the head of the plunger is provided with a short cylindrical portion 26. The plunger 24 has a tapering portion 27 which terminates in a cylindrical portion 28 of slightly greater diameter than the head of the plunger for a purpose to be described later.

Intermediate the cylindrical portions 26 and 28 the plunger is of a reduced diameter to avoid unnecessary friction in the expansion of the thimble. Surrounding the plunger 24 is a reciprocable block or piston 31 which is urged downwardly by a spring 32 resting at its upper end against the head 23 of the press. Surrounding the block 31 is a cylinder or sleeve 33. The block 31 is provided with a shoulder 34 and the sleeve is provided with a cooperating shoulder 35 for limiting the relative movement between the block and the sleeve.

The lower end of the sleeve is provided with a bevelled inner periphery 20 for crimping the flange 17 against the bevelled edge of the thimble when the head 23 of the press strikes the upper end of the sleeve.

When the hose and sleeve have been placed upon the anvil as described above and the thimble 15 has been started into the hose the press head is moved downwardly, forcing the thimble into the hose and causing the parts to assume the position shown in Fig. 1. Upon a further downward movement of the press head spring 32 acting through block 31 will cause the disc 19 of the thimble to be seated within the flange 17 of the sleeve. A still further downward movement of the press head will cause the head of plunger 25 to enter the bore of the thimble and expand the thimble to compress the hose against the inner wall of the sleeve as shown in Fig. 2. Just as the head of the plunger has passed through the entire thimble and expanded it, the enlarged portion 28 of the plunger enters the upper end of the thimble to enlarge this portion so as to permit the ready removal of the plunger head.

When the plunger head has passed through the thimble and the enlarged portion 28 of the plunger is within the end of the timble the press head 23 strikes the upper end of sleeve 33 and causes the bevelled inner periphery of the lower end of the sleeve to crimp the flange 17 inwardly to securely interlock the sleeve with the thimble, as shown in Fig. 2, completing the assembling operation. It will be noted that at this time spring 32 is considerably compressed so that upon the raising of the press head 23 and the withdrawal of the plunger from the coupling the spring will exert sufficient pressure upon block 31 to retain the coupling upon the anvil and allow the plunger to be withdrawn from the completed coupling. The novel features of the hose coupling shown in this application are claimed in my divisional application, Serial No. 619,368, filed June 27, 1932.

While the apparatus has been described in connection with the assembling of a particular type of coupling member, it will be apparent to those skilled in the art that the device may be modified to assemble other types of couplings without departing from the spirit and scope of the invention, which is to be limited only by the appended claims.

I claim:

1. In an apparatus for attaching a coupling member consisting of a sleeve and thimble to a hose comprising means for inserting the thimble in the hose and abutting the thimble against the sleeve, means for expanding the thimble to engage the hose with the sleeve, and means for interlocking the sleeve and thimble.

2. An apparatus for attaching a coupling member to a hose comprising reciprocable means having a member for inserting a thimble in the sleeve upon initial movement of said means and a member for expanding the thimble upon further movement thereof.

3. An apparatus for attaching a coupling member consisting of a thimble and sleeve to a hose comprising means for inserting the thimble in the hose, means for expanding the thimble and compressing the hose against the sleeve, means for interlocking the thimble with the sleeve, and means for preventing contraction of the thimble during the interlocking operation.

4. In an apparatus for attaching a sleeve and thimble to a hose to form a coupling, means for expanding the thimble to compress the hose against the sleeve, and means for interconnecting the thimble with the sleeve to prevent relative movement thereof.

5. An apparatus for attaching a sleeve and thimble to a hose to form a coupling, comprising a cylinder, a piston within the cylinder and having a cylindrical bore, a plunger extending through said cylindrical bore, a spring engaging the piston and having its other end movable with the plunger, means for moving the plunger toward the thimble thereby causing the piston to insert the thimble in the hose, the further movement of the plunger expanding the thimble, and means for actuating the cylinder upon a predetermined movement of the plunger whereby the thimble and sleeve are interlocked.

6. An apparatus for attaching a coupling consisting of a sleeve and thimble to a hose comprising a reciprocable member for inserting the thimble in the hose, a plunger for expanding the thimble and a cylinder for crimping the end of the sleeve to interlock the sleeve and thimble.

7. An apparatus for attaching a coupling consisting of a sleeve and thimble to a hose comprising means for inserting the thimble in the hose, means for expanding the thimble, means for interlocking the sleeve and thimble, and means actuating the aforesaid means in sequence.

8. An apparatus for attaching a coupling consisting of a sleeve and thimble to a hose comprising a plunger for expanding the thimble, said plunger having a head and an enlarged portion spaced from the head, a cylinder for exerting an inward radial pressure on the sleeve to interlock the sleeve and thimble, and means causing said cylinder to become effective after the enlarged portion of the plunger is inserted in the thimble.

9. An apparatus for attaching a coupling consisting of a sleeve and thimble to a hose comprising a plunger for expanding the thimble within the hose, and a cylinder having a bevelled inner periphery for crimping the end of the sleeve over the thimble.

10. An apparatus for attaching a coupling sleeve to a hose comprising reciprocal means having a member for inserting a thimble in the hose upon initial movement of said means, a member for expanding the thimble upon further movement thereof and compressing the hose against the sleeve, and means formed in the sleeve for interlocking said sleeve and said hose upon the compression of said hose.

11. An apparatus for attaching a coupling sleeve to a hose comprising reciprocal means having a member for inserting a thimble in the hose upon initial movement of said means, a member for expanding the thimble upon further movement thereof and compressing the hose against the sleeve, means formed in the sleeve for interlocking said sleeve and said hose upon the compression of said hose, and means for interlocking said sleeve and said thimble.

12. An apparatus for attaching a coupling sleeve to a hose comprising reciprocal means having a member for inserting a thimble in the hose upon initial movement of said means, a member for expanding the thimble upon further movement thereof and compressing the hose against the sleeve, and an annular restricted portion in the bore of the sleeve forming means for interlocking the hose and the sleeve upon the expansion of said thimble.

13. An apparatus for attaching a coupling consisting of a sleeve and thimble to a hose comprising a reciprocable member for inserting the thimble in the hose and a two-diameter plunger of larger diameter than the thimble for expanding the thimble, throughout its entire length.

14. An apparatus for attaching a coupling consisting of a sleeve and thimble to a hose comprising a reciprocable member for inserting the thimble in the hose and a single plunger directly engageable with the thimble throughout its entire length for expanding the thimble to two diameters.

15. An apparatus for attaching a coupling consisting of a sleeve and thimble to a hose comprising a reciprocable member for inserting the thimble in the hose and a plunger having a smaller end portion and relatively larger upper shank portion directly engageable with the thimble for expanding the thimble to two diameters.

16. An apparatus for attaching a coupling consisting of a sleeve and thimble to a hose comprising a reciprocable member for inserting the thimble in the hose and a two-diameter plunger directly engageable with the thimble for expanding the thimble to a relatively greater diameter at its outer end than the internal portion thereof.

17. An apparatus for attaching a coupling to a hose comprising means for inserting a thimble in the hose and means for subsequently expanding the thimble to a relatively greater extent near its outer end than at its internal portion comprising a reciprocable member directly engageable with the thimble.

18. An apparatus for attaching a coupling consisting of a two-diameter sleeve and a thimble to a hose comprising means for inserting the thimble in the hose and a plunger having a preliminary expansion portion of one diameter and another portion of larger diameter directly engageable with the thimble for additionally expanding it, for expanding the thimble to two diameters and interlocking the sleeve and thimble.

In witness whereof, I hereunto subscribed my name this 30th day of April, 1929.

JOSEPH R. HEIDLOFF.